United States Patent
Guilmette et al.

[11] Patent Number: 5,421,092
[45] Date of Patent: Jun. 6, 1995

[54] PIVOTABLY MOUNTED KITCHEN APPLIANCE

[75] Inventors: Victor R. Guilmette, Shelton; Richard B. Kosten, West Haven, both of Conn.

[73] Assignee: Black & Decker Inc., Newark, Del.

[21] Appl. No.: 155,677

[22] Filed: Nov. 22, 1993

[51] Int. Cl.⁶ .................... B67B 7/44; B67B 7/60
[52] U.S. Cl. .......................... 30/416; 30/434;
    30/123; 248/664; 248/674; 248/324; 451/69
[58] Field of Search ............ 30/409, 400, 416, 417,
    30/418, 419, 420, 421, 422, 423, 424, 425, 426,
    434, 123; 451/69; 248/664, 669, 674, 324

[56] References Cited

U.S. PATENT DOCUMENTS

| | | | |
|---|---|---|---|
| 2,651,838 | 9/1953 | Curtis | 30/9 |
| 2,662,279 | 12/1953 | Wilson | 30/9 |
| 2,765,207 | 10/1956 | Moore | 312/248 |
| 2,771,263 | 11/1956 | Boho | 248/298 |
| 3,433,444 | 3/1969 | Smith | 248/279 |
| 4,561,182 | 12/1985 | Yamamoto et al. | 30/433 |
| 4,620,476 | 11/1986 | Brym | 99/484 |
| 4,635,615 | 1/1987 | Itoh et al. | 126/273 A |
| 4,663,849 | 5/1987 | Nickelson | 30/296 A |
| 4,702,007 | 10/1987 | Nomura et al. | 30/423 |
| 4,860,455 | 8/1989 | Conneally | 30/404 |
| 4,979,308 | 12/1990 | Moore | 30/400 |

*Primary Examiner*—Rinaldi I. Rada
*Attorney, Agent, or Firm*—Barry E. Deutsch

[57] ABSTRACT

A kitchen appliance has a working unit with a motor and a mounting bracket for pivotably mounting the working unit under a kitchen cabinet. The working unit has a housing with a working area at a first face and a decorative second face. In a first position of the working unit, the working area is exposed at a first location. In a second position of the working unit, the working area is concealed by the mounting bracket and the decorative second face is exposed at the first location. Deflectable cantilevered detents are provided to stationarily hold the working unit at the first and second positions until moved by a user.

11 Claims, 6 Drawing Sheets

FIG. 5.
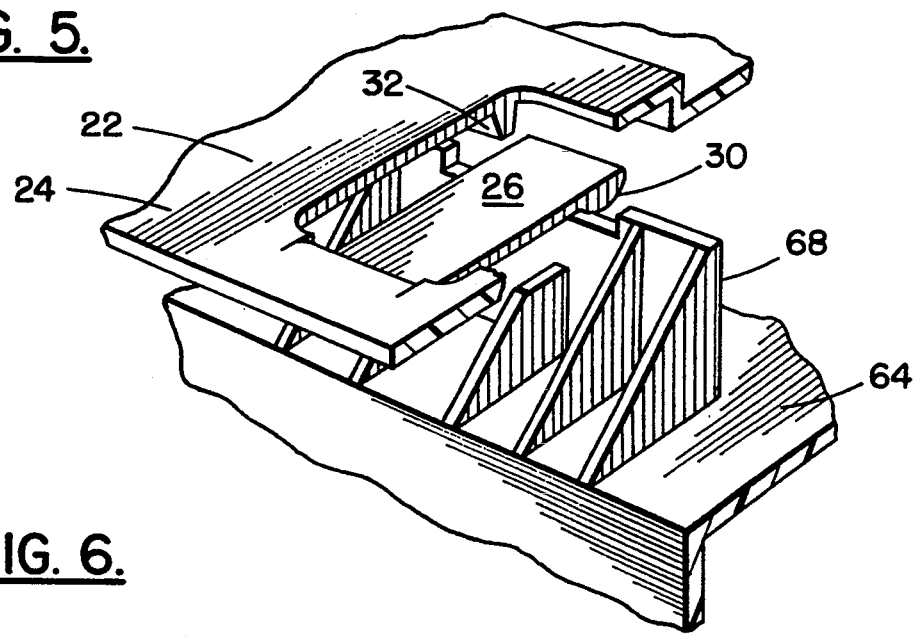
FIG. 6.
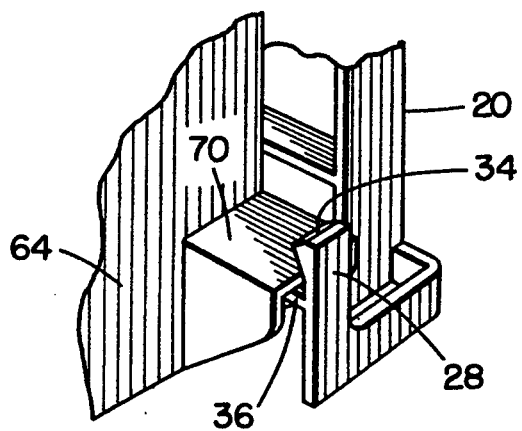
FIG. 7.
FIG. 8.
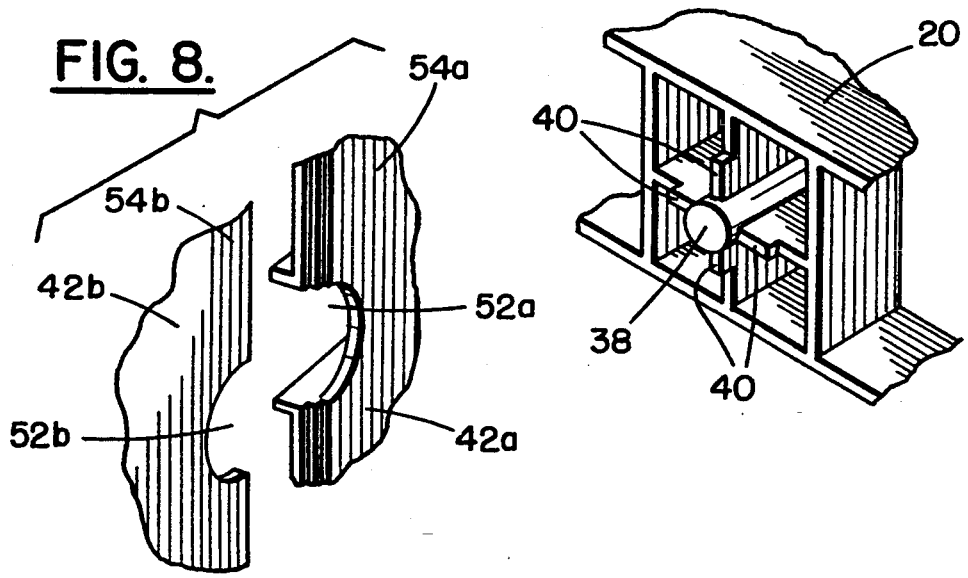

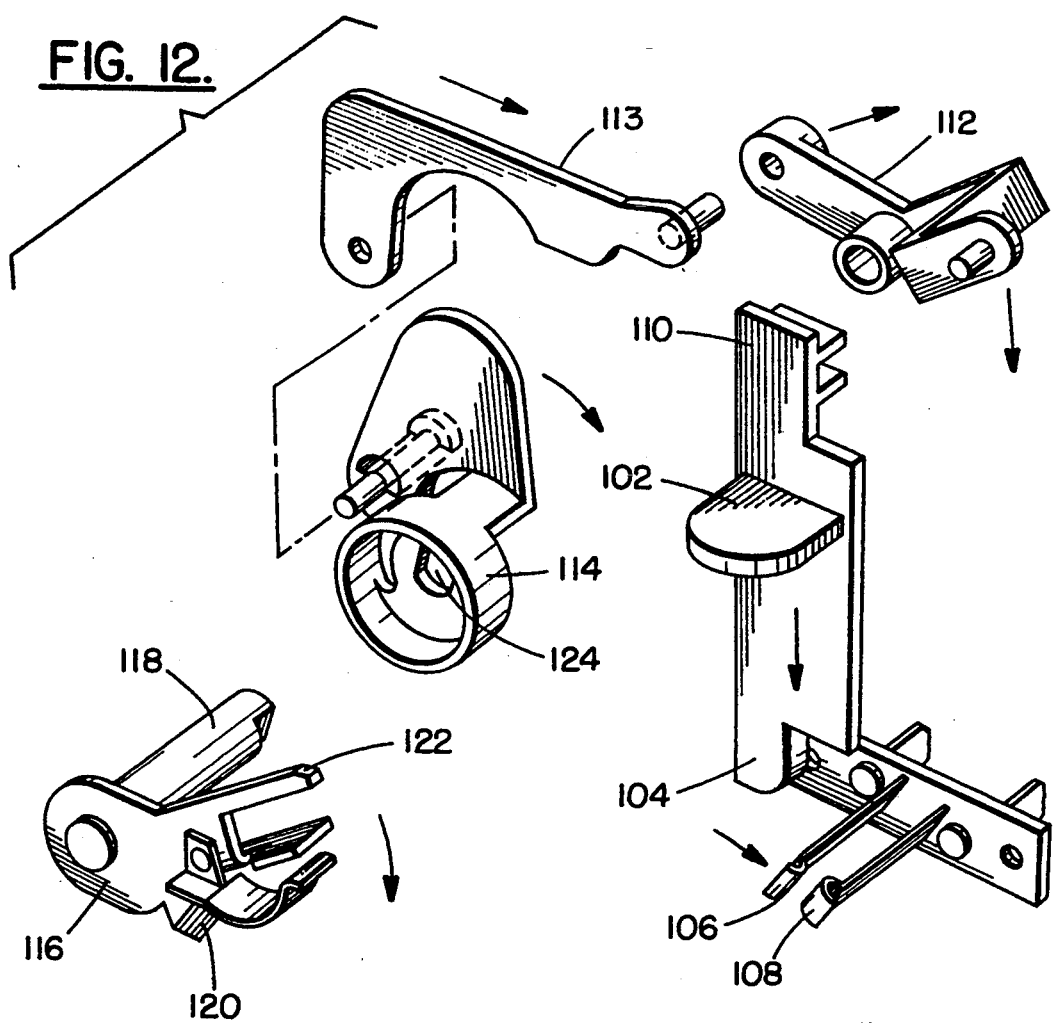

PIVOTABLY MOUNTED KITCHEN APPLIANCE

BACKGROUND OF THE INVENTION

1. Field of the Invention

The present invention relates to kitchen appliances and, more particularly, to an appliance mounted to a kitchen cabinet having a rotating housing.

2. Prior Art

U.S. Pat. No. 4,620,476 discloses a kitchen appliance having a can opener and blender pivotably mounted to a mounting bracket connected to a kitchen cabinet. U.S. Pat. No. 4,663,849 discloses a combined can opener and knife sharpener pivotably mounted to a kitchen cabinet. U.S. Pat. Nos. 2,771,263; 2,662,279; 2,651,838; and 2,765,207 disclose manually operated can openers pivotably connected to cabinets. U.S. Pat. Nos. 4,561,182; 4,860,455; and 4,979,308 discloses other electric can openers mounted under kitchen cabinets.

SUMMARY OF THE INVENTION

In accordance with one embodiment of the present invention a kitchen appliance is provided comprising a mounting bracket and working unit. The mounting bracket is for mounting to a kitchen cabinet. The working unit has a housing with a working area at a first face and a decorative second face. The working unit is movably mounted to the mounting bracket between a first position and a second position. The first position has the working area at the first face exposed at a first location. The second position has the working area concealed by the mounting bracket and the decorative second face exposed at the first location.

In accordance with another embodiment of the present invention a can opener is provided comprising a working unit and a mounting bracket. The working unit has a housing, an electric motor and a can moving system. The mounting bracket is for mounting the working unit to a bottom of a kitchen cabinet. The mounting bracket has a receiving area with a substantially open front. The working unit is movably mounted to the mounting bracket in the receiving area between the first position and a second position. The mounting bracket has at least one cantilevered deflectable detent adapted to hold the working unit at the second position until moved by a user.

In accordance another embodiment of the present invention a kitchen appliance is provided comprising a working unit and a mounting bracket. The working unit has a first housing and an electric motor locating in the first housing. The mounting bracket is for attachment to a bottom of a kitchen cabinet. The mounting bracket has a second housing with two side walls forming a receiving area therebetween. The working unit a pivotably mounted to the side walls in the receiving area between a first position and a second position. At least one of the housings has a deflectable cantilevered detent latch adapted to contact the other housing at one of the two positions to stationarily hold the two housings relative to each other until moved by a user.

BRIEF DESCRIPTION OF THE DRAWINGS

The foregoing aspects and other features of the invention are explained in the following description, taken in connection with the accompanying drawings, wherein:

FIG. 5 is a partial perspective cut away view of a top section of the appliance as shown in FIG. 3;

FIG. 6 is a partial perspective view of a rear portion of the appliance as shown in FIG. 4;

FIG. 7 is a partial perspective view of an interior side of a side wall of the mounting bracket shown in FIGS. 1 and 2;

FIG. 8 is an exploded perspective view of a side of the working unit housing adapted to be pivotably mounted on the pivot posts shown in FIG. 7;

FIG. 12 is an exploded perspective view of the mechanical linkage between the actuating switch and the cutting blade.

DETAILED DESCRIPTION OF THE INVENTION

Figure 1:
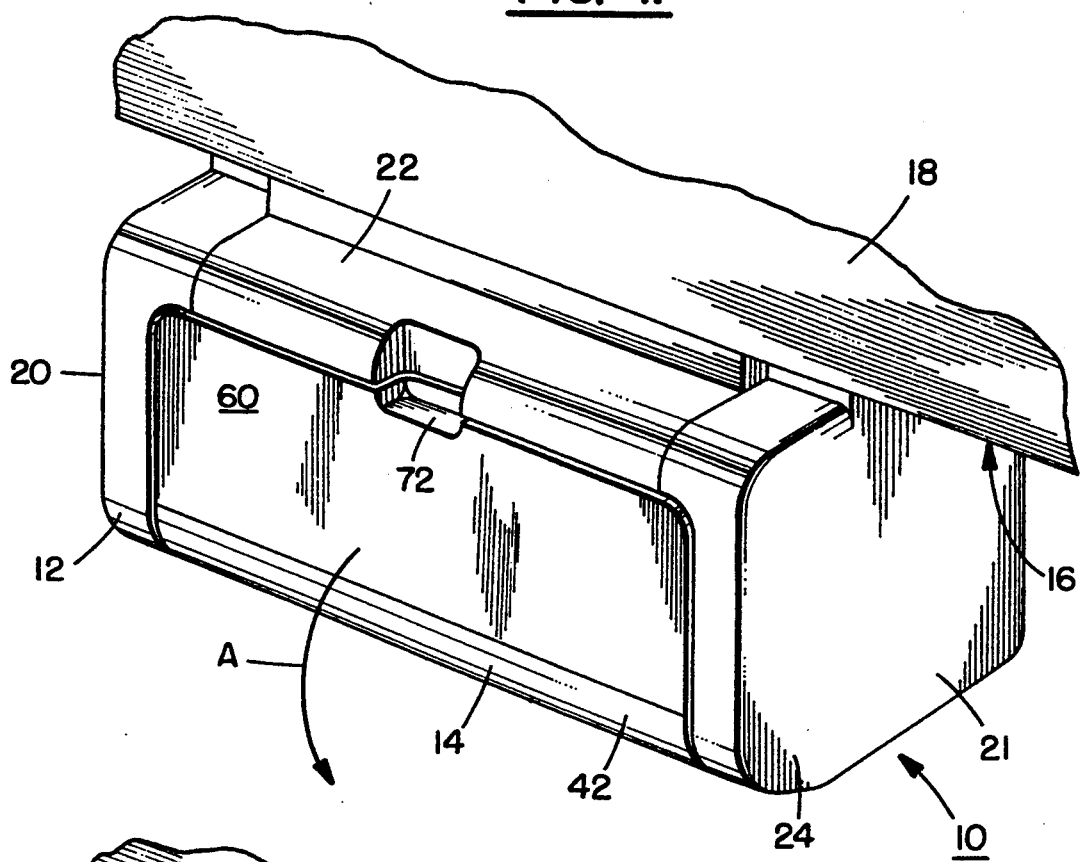
FIG. 1 is a perspective view of an appliance incorporating features of the present invention shown in a closed position.
Figure 2:
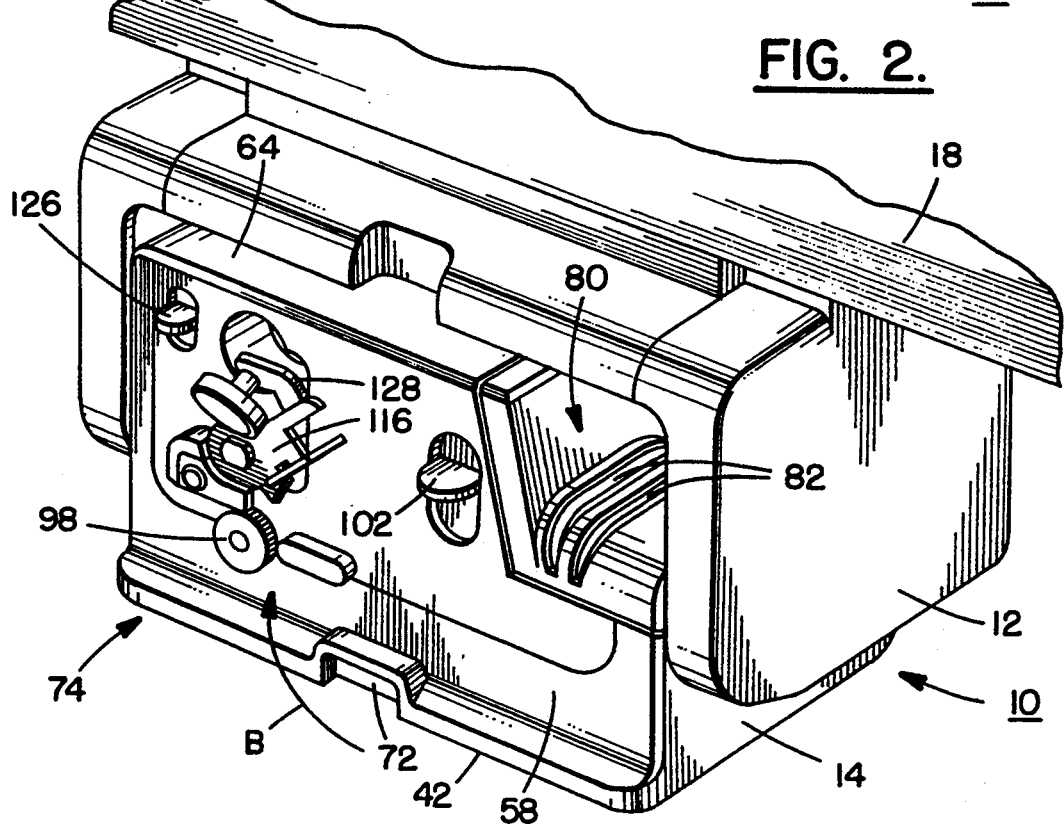
FIG. 2 is a perspective view of the appliance shown in FIG. 1 in an open position.

Referring to FIGS. 1 and 2, there is shown perspective views of an electrically operated combined can opener and knife sharpener appliance 10 at two positions; an open position shown in FIG. 2 and a closed position shown in FIG. 1. Although the present invention will be described with reference to the single embodiment shown in the drawings, it should be understood that features of the present invention could be incorporated into many different forms and varieties of embodiments. In addition, any suitable size, shape or type of elements or materials could be used.

Figure 3:
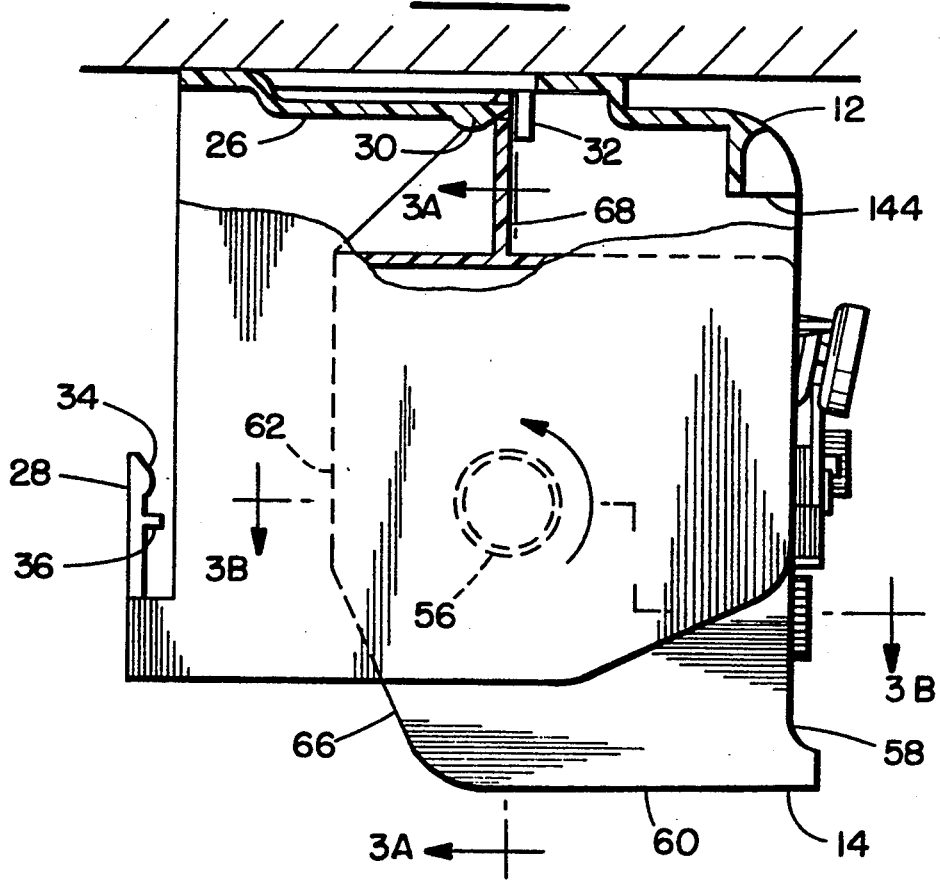
FIG. 3 is a side view of the appliance shown in FIG. 2 with a partial cut away section.
Figure 4:
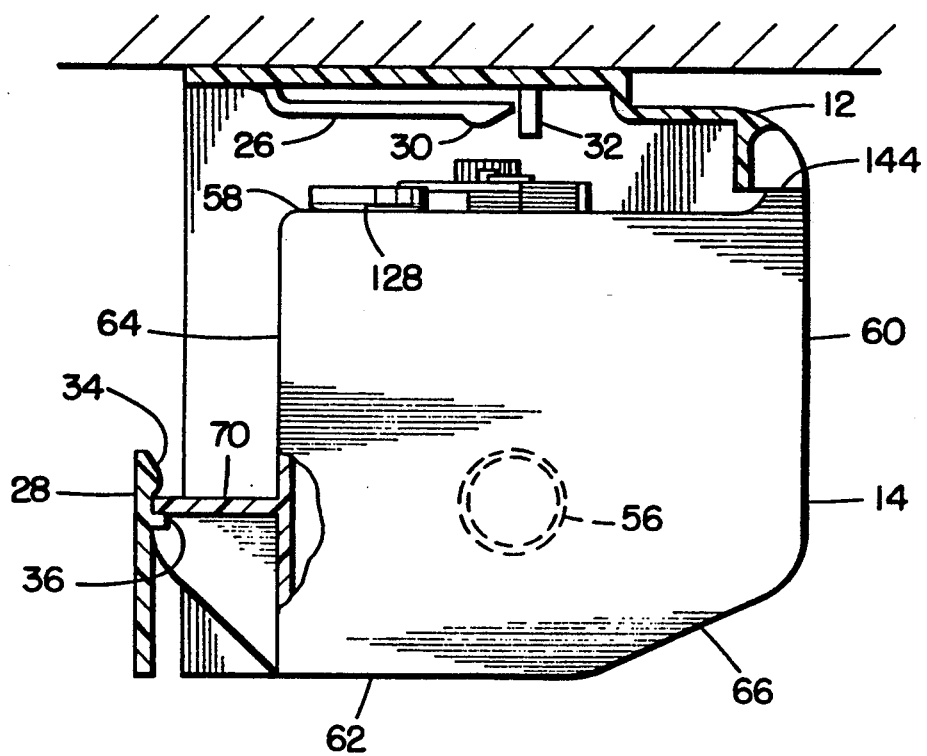
FIG. 4 is a side view of the appliance shown in FIG. 1 with partial cut away sections.

The appliance 10 generally comprises a mounting bracket 12 and a working unit 14. The mounting bracket 12 is provided for mounting the working unit 14 to the bottom 16 of a kitchen cabinet 18. Suitable fasteners (not shown) such as screws or bolts are used to fixedly attach the mounting bracket 12 to the cabinet 18. It should be understood that alternate embodiments could include the mounting bracket 12 being adapted to connect to a side of the cabinet, a front of a cabinet, a top of a counter top, etc. The appliance 10 could also be used in locations other than a domestic kitchen, such as a commercial kitchen or other suitable location. In the embodiment shown, the mounting bracket 12 is comprised of a molded plastic or polymer material. However, any suitable material or combination of materials could be used. The bracket 12 includes two side arms or walls 20, 21 and a center section 22 that form a general upsidedown U-shaped housing 24 with a receiving area between the two side walls 20, 21. The walls 20, 21 are fixedly and stationarily connected to the center section 22 to form a unitary assembly of the housing 24. In an alternate embodiment, the housing 24 could be provided as a single member. Referring also to FIGS. 3 and 4, the housing 24 includes a two deflectable cantilevered detents 26, 28. The detents 26, 28 are provided for stationarily locating the working unit 14 at the first open position shown in FIG. 2 and the second closed position shown in FIG. 1. Referring also to FIG. 5, the first detent 26 is located at the top of the housing 24 with a head 30. Two stops 32 (only one of which is shown) are located in front of and on opposite sides of the head 30. Referring also to FIG. 6, the second detent 28 is located at the back of the housing 24. The second detent 28 extends from the rear of side wall 20 behind the receiving area of the housing 24. The second detent 28 includes a head 34 and a stop 36. In alternate embodiments other types, locations, or numbers of detents could be provided on the housing 24. In another type of alternate embodiment, deflectable detents could be provided on the working unit 14 rather than the mounting bracket housing 24. Referring also to FIG. 7, the interior sides of the side walls 20, 21 include a pivot post 38 and raised ribs 40 that project inward towards the receiving area.

Figure 3A:
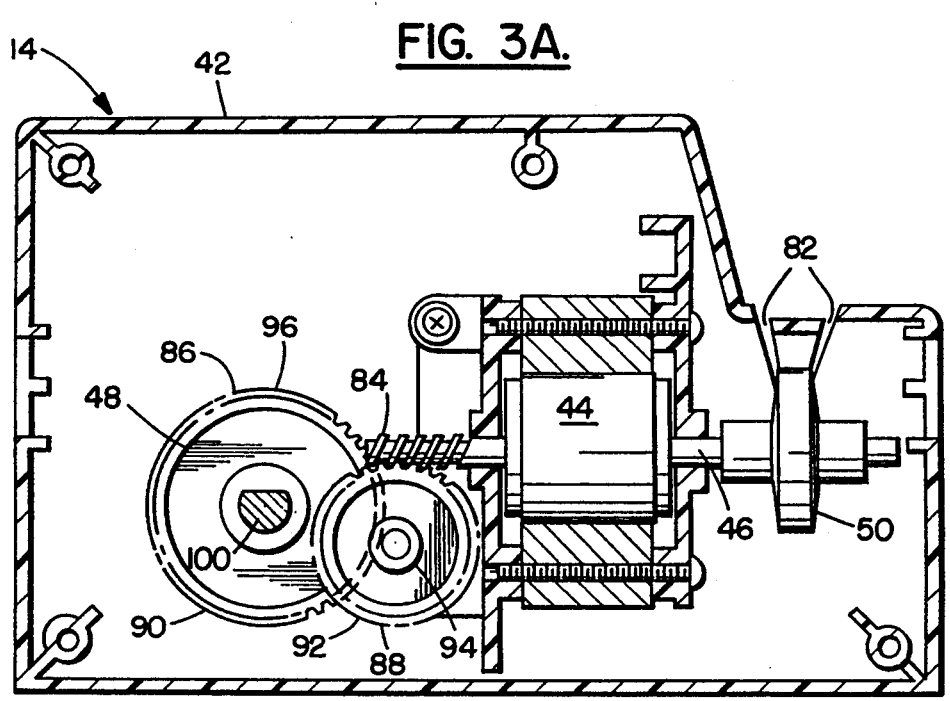
FIG. 3A is a schematic cross sectional view of the working unit showing connection of the motor to the knife sharpening wheel and reduction gearing taken along line A—A in FIG. 3.
Figure 3B:
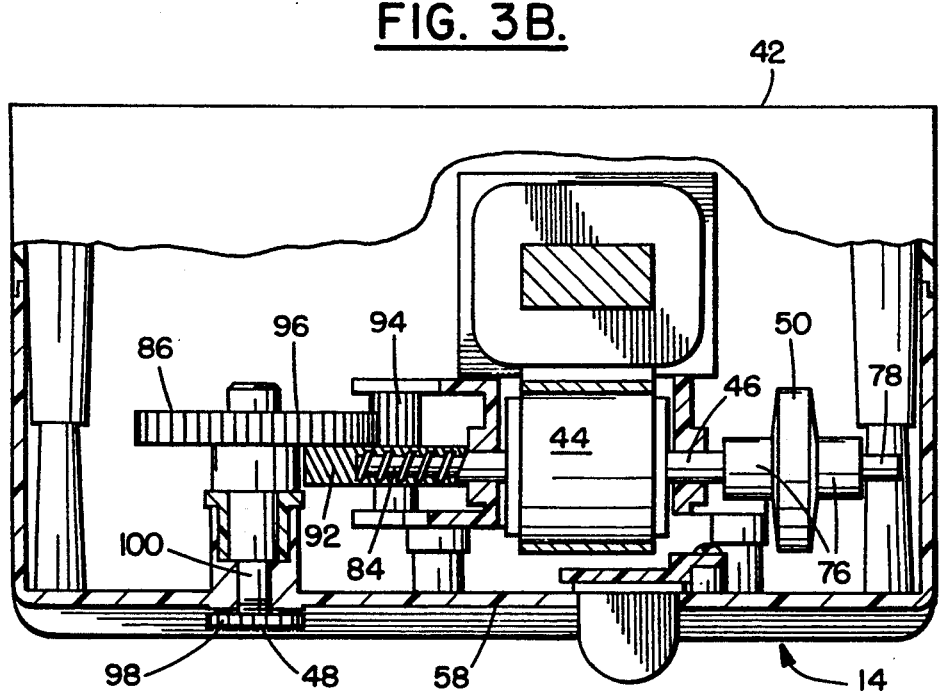
FIG. 3B is a schematic cross sectional view of the working unit shown in FIG. 3 taken along line B—B.

Referring also to FIGS. 3A and 3B, the working unit 14 generally comprises a housing 42, a motor 44 having a drive shaft 46, a can moving system 48 and a knife sharpener wheel 50. The housing 42 is comprised of molded plastic or polymer members that are connected to each other. In the embodiment shown, two of the housing pieces 42a, 42b come together as shown in FIG. 8 with semi-circular openings 52a, 52b on both sides of the housing 42 that capture pivot posts 38 (see FIG. 7) on the side walls therein to form pivotable mounts 56 (see FIGS. 3 and 4). The raised ridges 40 are provided for the exterior sides 54a, 54b of the housing pieces 42a, 42b to ride against. This allows the rest of the housing 42 to be spaced from the rest of the side walls 20, 21 of the mounting bracket housing 24. This allows free motion between the two housings, but nonetheless provides a stable pivotable connection of the working unit 14 to the mounting bracket 12 in the receiving area. Additional pivot plates (not shown) may be connected to the pivot post 38 inside the working unit housing 42 to add strength to the pivotable mounts 56.

Referring to FIGS. 1-4, the working unit housing 42 generally comprises a first face 58, a decorative second face 60, and two other exterior walls or faces 62, 64. The first face 58 and second face 60 are generally orthogonal to each other. The third face 62 has some air vents (not shown) for cooling air to access the motor 44. Diagonal face 66 between the second face 60 and third face 62 is merely provided for decorative appearances. As seen in FIGS. 3-6, the fourth face 64 includes a first projection 68 and a second projection 70. The first projection 68 is located in the center of the fourth face 64 and is adapted to contact and deflect first detent 26, and be held between the head 30 of the first detent 26 and the stops 32 when the working unit 14 is moved to its open position (see FIGS. 2, 3 and 5). The second projection 70 is located in the corner of the fourth face 64 and is adapted to contact and deflect second detent 28, and be held between the head 34 of the second detent 28 and the stop 36 when the working unit 14 is moved to its closed position (see FIGS. 1, 4 and 6).

As noted above, the working unit 14 is pivotably mounted to the mounting bracket 12 at the two side walls 20, 21. The working unit is rotatable about 90° between the closed position shown in FIGS. 1 and 4, and the open position shown in FIGS. 2 and 3. In the closed position, the second face 60 is located at the front of the appliance 10, the first face 58 is located inside the appliance 10 beneath the center section 22, and the second projection 70 is retained by the second detent 28 to stationarily hold the working unit 14 relative to the mounting bracket 12. A user can open the appliance 10 by pushing down on the working unit housing 42 at finger area 72. When sufficient force is applied by the user at finger area 72, the second detent 28 will be wedged back by the second projection 70 until the second projection disconnects from the second detent 28. The working unit 14 is then free to rotate as indicated by arrow A in FIG. 1 to the open position shown in FIG. 2. As the working unit 14 nears its fully open position, the first projection 68 contacts and deflects the first detent 26. The first detent 26 snaps behind the first projection 68 to capture the first projection 68 between the head 30 and the stops 32. After the user is finished using the can opener or knife sharpener, the working unit 14 can be rotated up as indicated by arrow B in FIG. 2 to conceal the working area 74 at the first face 58 within the appliance 10 and once again display the decorative second face 60 at the front of the appliance 10. In order to rotate the working unit 14 up, a user rotates the working unit housing 42 causing the first projection 68 to deflect the first detent 26 out of its path. As the working unit approaches the fully closed position, the second projection 70 contacts and deflects the head 34 of the second detent 28. The head 34 then snaps behind the second projection 70 to capture the second projection 70 between the head 34 and the stop 36. Thus, the working unit 14 is once again held in a stationary position relative to the mounting bracket 12 until intentionally moved by a user. In alternate embodiments, alternative or additional means to stationarily locate the working unit relative to the housing could be provided. Alternative or additional means to movably mount the working unit to the mounting bracket could also be provided.

Referring particularly to FIGS. 2, 3A and 3B, the motor 44 is an electrical shaded pole motor. However, in alternate embodiments, other types of motors could be used. The drive shaft 46 extends out of the motor 44 in two opposite directions. The knife sharpener wheel 50 is connected to a first end of the drive shaft 46. The can moving system 48 is connected to an opposite second end of the drive shaft 46. The drive shaft 46 is orientated parallel to the first face 58 of the housing 42. The knife sharpener wheel 50 is directly connected to the drive shaft 46 to be axially rotated when the shaft 46 is rotated. In a preferred embodiment, the knife sharpener wheel 50 is slightly movable along the length of the first end of the drive shaft 46 and is biased by springs (not shown) in collars 76 at a home position. Because the distance between the wheel 50 and motor 44 is short, no additional bearings to support the wheel 50 are needed. However, a bearing could be provided at the far end 78 of the first end if desired. The housing 42 has a shape above the wheel 50 to form an open area 80 between the mounting bracket 12 and the working unit 14 when the working unit 14 is in its open position as seen in FIG. 2. The housing 42 also has slots 82 to allow a blade of a knife (not shown) to pass through the housing 42 to access the wheel 50. Thus, a user can pass a blade of a knife through a plane of the first face 58 into area 80, through one of the slots 82, and against the wheel 50 for sharpening.

The second end of the drive shaft 46 has a worm gear 84. The worm gear 84 is connected to reduction gearing 86 of the can moving system 48. The reduction gearing includes a first gear 88 and a second gear 90. The first gear 88 has a helical gear section 92 and a first spur gear section 94. The second gear 90 has a second spur gear section 96. The can moving system 48 also includes a drive wheel 98 located at the exterior of the first face 58 for moving a can (not shown). The drive wheel 98 is connected to the reduction gearing 86 by a drive wheel shaft 100. More specifically, the drive wheel shaft 100 is removably connected to the center of the second gear 90 such that the drive wheel shaft 100 and drive wheel 98 are rotated when the second gear 90 is rotated.

In order to provide suitable torque at the drive wheel 98 for moving a can while being cut, to rotate the knife sharpener wheel 50 at a suitable speed for sharpening, and to package the working components such that the user can access the sharpener wheel 50 from the front of the appliance, the worm gear 84 is used. The worm gear 84 allows the drive shaft 46 to be located parallel to the first face 58 with only two gears 88, 90 connecting the drive shaft 46 to the drive wheel shaft 100. However, it has been found that in order to provide suitable torque, merely any type of worm gear will not suffice. The worm gear 84 needs to have a three or four lead design. This is unusual because three and four lead worm gears are difficult to manufacture. The worm gear for the embodiment shown in the drawing can be obtained from Yamada Corporation of Tokyo, Japan. It has been discovered that by using a three or four lead worm gear the shaded pole motor 44 can be used to provide sufficient torque at the drive wheel 98 and sufficient power and speed at the sharpener wheel 50 to allow the appliance to operate properly and, be manufactured at a reasonably low cost. Any added costs for the difficult to manufacture worm gear 84 are more than recovered by the reduced costs of the rest of the working components assembled as shown.

In order to energize the motor 44 a single control switch 102 (see FIG. 2) is provided at the first face 58. Referring particularly to FIGS. 2 and 12, the switch 102 is movably mounted on the housing 42. A first end 104 of the switch 102 is adapted to contact electrical contact 106 and press the contact 106 against contact 108. The contacts 106, 108 are connected between the power supply (such as an electrical outlet) and the motor 44. When the two contacts 106, 108 come into contact with each other, electricity can flow through the contacts to the motor 44. When the switch 102 is moved up, the contacts 106, 108 separate from each other and the motor 44 stops. Because the working area 74 for the can opener and the working area for the knife sharpener are both accessible from the front of the appliance 10 and, both are powered by the single motor 44, no additional control switches are necessary.

A second end 110 of the switch 102 is connected by linkage members 112, 113 to a rotator 114. The rotator 114 is rotatingly connected to the housing 42. The apparatus 10 includes a movable cutter 116 connected to the housing 42 over the drive wheel 98 at the first face 58. The cutter 116 has a connection shaft 118, a cutting blade 120 and a blocker section 122. The connection shaft 118 is connected to rotator 114 in key hole 124 such that the connection shaft 118 is rotated when the rotator 114 is rotated. A locking mechanism (not shown) keeps the cutter 116 connected to the working unit 14. However, a removal switch 126 is provided to disengage the locking mechanism. This allows the cutter 116 to be removed from the working unit 14 for cleaning.

Figure 9A:
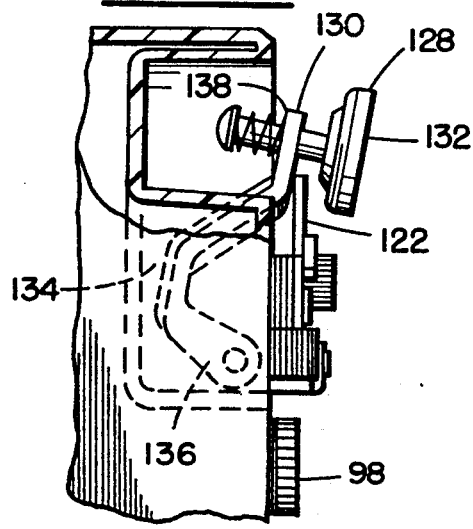
FIG. 9A is a partial side view with a cut away section of the top front of the working unit shown in FIGS. 2 and 3.
Figure 9B:
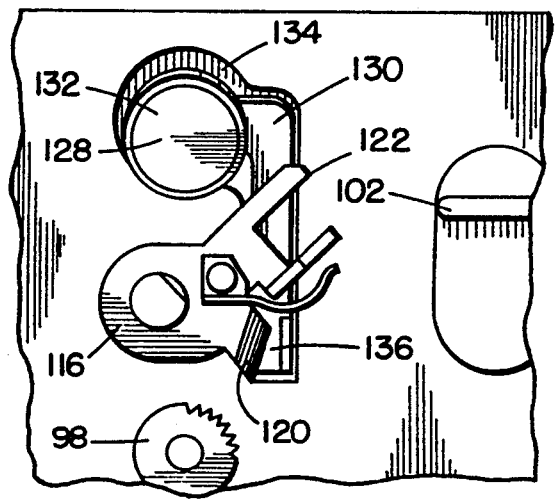
FIG. 9B is a front view of the working unit shown in FIG. 9A.
Figure 10A:
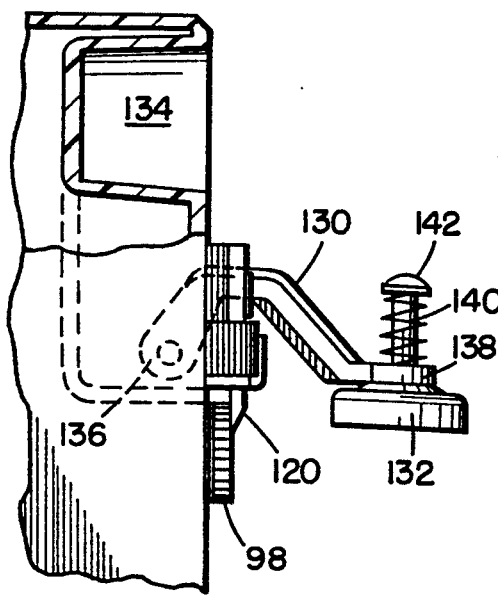
FIG. 10A is a partial side view with a cut away section of the front of the working unit as shown in FIG. 9A with the lid retainer and cutting blade moved to a different position.
Figure 10B:
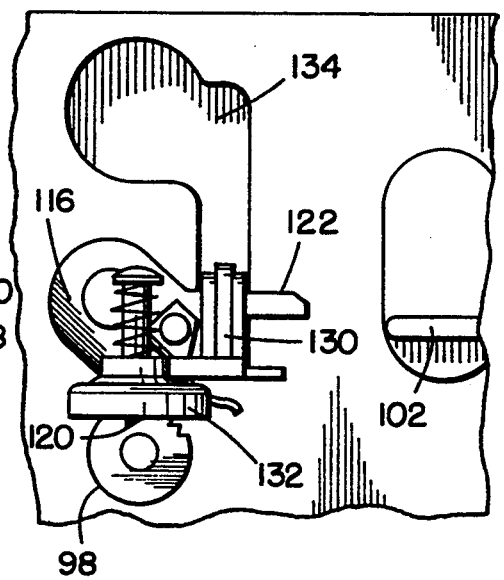
FIG. 10B is a partial front view of the working unit as shown in FIG. 10A.

Referring also to FIGS. 9B and 10B, the relationship of the movement of the control switch 102 to the movement of the cutter 116 is illustrated. As seen in FIG. 9B, with the control switch 102 in an up position, the cutter is in an up position with an open area between the cutter 116 and the drive wheel 98 for locating an edge of a can (not shown). When the control switch 102 is moved down, as shown in FIG. 10B, the cutter is rotated to move the cutting blade 120 down adjacent the drive wheel 98. In a preferred embodiment, a spring (not shown) is connected to the rotator 114 to bias the control switch 102 and cutter 116 in up positions. The control switch 102 not only controls the motor 44 and movement of cutter 116, but it also controls movement of the lid retainer 128.

Referring particularly to FIGS. 2, 9A, 9B, 10A, and 10B, the lid retainer 128 generally comprises an arm 130 and a magnet 132. The first face 58 of the housing 42 has a lid retainer recess 134 suitably sized and shaped to entirely contain the arm 130 therein. A first end 136 of the arm 130 is pivotably connected to the housing 42 in the bottom of the recess 134. An opposite second end 138 of the arm 130 has the magnet 132 connected thereto by a pin 140 and a spring 142. As noted in FIGS. 9A and 9B, with the control switch 102 in its up position, the lid retainer is held in a retracted position by the blocker section 122 of the cutter 116. When the control switch 102 is moved towards its actuated position shown in FIGS. 10A and 10B, the blocker section 122 is rotated down. As the blocker section 122 is rotated down, it moves out of the path of the arm 130. Because of the unique shape of the arm 130 and its weight distribution with the magnet 132 on the housing 42, as the blocker section 122 is moved out of the forward path of the lid retainer 128, the lid retainer 128 is gravity fed from its retracted position (shown in FIGS. 9A and 9B) to its extended position (shown in FIGS. 10A and 10B). When the control switch 102 is moved back to its up position, the blocker section 122 moves up from its non-blocking position back towards its blocking position. As the blocker section 122 moves up, it pushes on the arm 130. This causes the arm 130 to rotate at end 136, causing the arm 130 to move from its extended position back to its retracted position inside the recess 134. Thus, as the cutter 116 is moved between its cutting and non-cutting positions, the blocker section 122 is moved into and out of the path of the lid retainer 128. When the blocker section 122 is in its blocking position, the lid retainer 128 is substantially contained in the recess 134 in its retracted position. When the blocker section 122 is in its non-blocking position, the lid retainer 128 is able to extend to its extended position. Hence, the movement of the control switch 102 also is able to automatically move the lid retainer 128 by means of the cutter 116.

Figure 11:
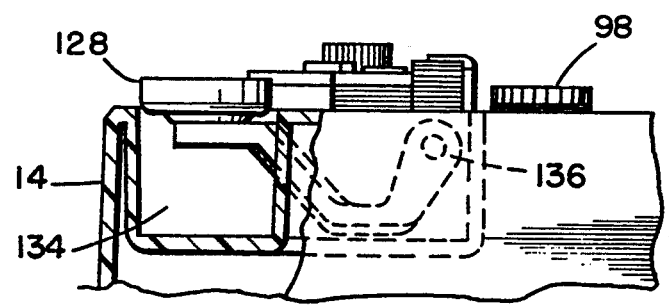
FIG. 11 is a side view of the front of the working unit with a partial cut away section when the working unit is in its closed position as shown in FIGS. 1 and 4.

As noted above, the control switch 102 and cutter 116 are normally biased in the position shown in FIGS. 3, 9A and 9B when the working unit 14 is in its open position. Referring also to FIGS. 4 and 11, when the working unit 14 is rotated upward by a user, the lid retainer 128 is able to pass beneath the front ledge 144 at the center section of the mounting bracket 12. As shown in FIG. 11, the lid retainer 128 is able to be substantially entirely recessed in the recess 134 as the working unit 14 is moved to its closed position. Because the lid retainer 128 is recessed in order to pass under the ledge 144, the apparatus 10 is able to have a smaller size than would otherwise be allowed if the lid retainer 128 were not recessed. It should be understood, however, that in alternate embodiments alternative means could be used to movably mount the lid retainer on the working unit, or to control movement of the lid retainer, or to recess the lid retainer. In addition, alternative means could be provided to move the cutter 116, or an alternative type of blocking system could be provided.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A kitchen appliance comprising: a mounting bracket including a generally U-shaped housing for mounting to a kitchen cabinet;

a working unit pivotably mounted in the U-shaped housing having a housing with a working are at a first face and a decorative second face, the working unit being movably mounted to the mounting bracket between a first position and a second position, the first position having the working are exposed at a first location and, the second position having the working area concealed by the mounting bracket and the decorative second face exposed at the first location; and said U-shaped housing including a pair of spaced deflectable cantilevered detents for selectively stationarily locating the working unit at the first and second positions until moved by a user, said working unit having first and second projections, a first of the projections being in engagement with one of the detents with the working unit in said first position and the second projection being in engagement with the other of the detents with the working unit in the second position.

2. A kitchen appliance as in claim 1 wherein the working unit comprises a can opener.

3. A kitchen appliance as in claim 1 wherein the working unit comprises a combined can opener and knife sharpener.

4. A kitchen appliance as in claim 1 wherein the working unit is adapted to move about 90° relative to the mounting bracket and, the first and second faces are generally orthogonal to each other.

5. A can opener comprising:

a working unit having a housing, an electric motor, and a can moving system;

a mounting bracket for mounting the working unit to a bottom of a kitchen cabinet, the mounting bracket having a receiving area with a substantially open front, the working unit being movably mounted to the mounting bracket in the receiving area between a first position and a second position; and said mounting bracket including two cantilevered deflectable detents and said housing including two spaced projections, with a first projection engaging a first detent to hold the working unit in the first position and a second projection engaging a second detent to hold the working unit in the second position.

6. A can opener as in claim 5 wherein the working unit includes a knife sharpener wheel connected to the motor.

7. A can opener as in claim 5 wherein the mounting bracket has two side arms with the working unit pivotably connected to the side arms.

8. A can opener as in claim 7 wherein the working unit and mounting bracket comprise means for allowing the working unit to rotate only 90°.

9. A can opener as in claim 5 wherein a first one of the detents is located at a back of the mounting bracket and a second one of the detents is located at a top of the mounting bracket.

10. A can opener as in claim 5 wherein the working unit has a lid retainer movably mounted on the housing between an extended position and a retracted position.

11. A can opener as in claim 10 wherein the housing has a recess for housing the lid retainer in the retracted position.

* * * * *